(12) United States Patent
Schumacher et al.

(10) Patent No.: US 7,225,369 B2
(45) Date of Patent: May 29, 2007

(54) DEVICE FOR MONITORING A PROCESSOR

(75) Inventors: Hartmut Schumacher, Freiberg (DE); Peter Taufer, Renningen (DE); Harald Tschentscher, Grossbottwar (DE); Thomas Huber, Beilstein (DE); Michael Ulmer, Moessingen (DE)

(73) Assignee: Robert Bosch GmbH, Stuttgart (DE)

( * ) Notice: Subject to any disclaimer, the term of this patent is extended or adjusted under 35 U.S.C. 154(b) by 300 days.

(21) Appl. No.: 10/416,766

(22) PCT Filed: Oct. 16, 2001

(86) PCT No.: PCT/DE01/03954

§ 371 (c)(1),
(2), (4) Date: Oct. 21, 2003

(87) PCT Pub. No.: WO02/41148

PCT Pub. Date: May 23, 2002

(65) Prior Publication Data

US 2004/0153886 A1    Aug. 5, 2004

(30) Foreign Application Priority Data

Nov. 14, 2000 (DE) ............... 100 56 408

(51) Int. Cl.
*G06F 11/00* (2006.01)

(52) U.S. Cl. .......................... 714/55; 714/56

(58) Field of Classification Search ........... 714/55, 714/56

See application file for complete search history.

(56) References Cited

U.S. PATENT DOCUMENTS

| 4,627,060 A | * | 12/1986 | Huang et al. ............... 714/36 |
| 4,635,258 A | | 1/1987 | Salowe |
| 4,726,024 A | | 2/1988 | Guziak et al. |
| 4,727,549 A | * | 2/1988 | Tulpule et al. ............. 714/55 |
| 5,398,332 A | * | 3/1995 | Komoda et al. ............. 714/55 |
| 5,839,096 A | * | 11/1998 | Lyons et al. ............... 702/183 |
| 6,789,114 B1 | * | 9/2004 | Garg et al. ................ 709/224 |

FOREIGN PATENT DOCUMENTS

| DE | 28 41 073 | 4/1980 |
| EP | 0 535 761 | 4/1993 |
| JP | 61-29239 | 2/1986 |

* cited by examiner

Primary Examiner—Scott Baderman
Assistant Examiner—Joshua Lohn
(74) Attorney, Agent, or Firm—Kenyon & Kenyon LLP

(57) ABSTRACT

A device for monitoring a processor is described. A watchdog simultaneously monitors the system clock, the software base functions and performs a check of the tests of the system components of the processor. If an error is detected, the watchdog communicates this to the processor, an error counter is incremented and at least one device that is connected to the processor is blocked. If the error counter attains a predetermined value, the block is continued until the device of the present invention is deactivated. If an additional error is detected during a blocking time, the blocking time is extended.

9 Claims, 2 Drawing Sheets

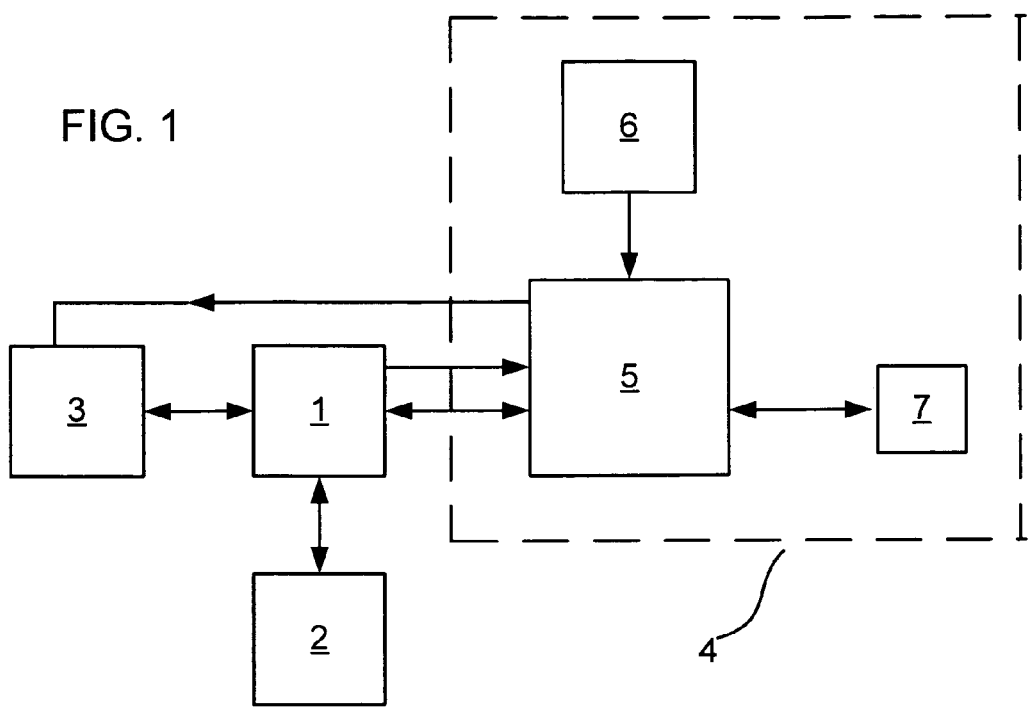
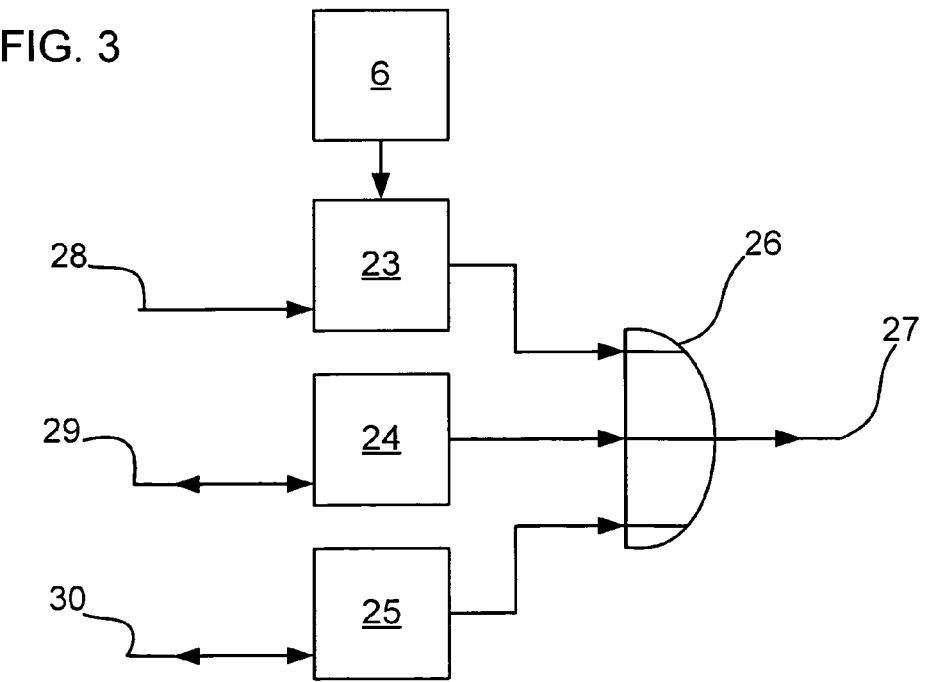

DEVICE FOR MONITORING A PROCESSOR

FIELD OF THE INVENTION

The present invention relates to a device for monitoring a processor.

BACKGROUND INFORMATION

Conventionally, a watchdog may be provided for a microcontroller system, which is triggered at specific time intervals and even awaits this triggering in defined time windows. This is known as a window watchdog. If the watchdog is triggered outside the window, the microcontroller system is reset.

SUMMARY

According to an example embodiment of the present invention for monitoring a processor, the tasks of the watchdog may be performed separately and independently of each other, but concurrently. In this way, not only dominant errors are detected, but also all errors occurring while the particular tasks are being performed. These tasks include monitoring the system clock, monitoring the correct sequence of system-relevant software base functions and monitoring built-in self-tests of system components such as, for example, memory modules or other components within the processor.

Furthermore, a reset function is advantageously eliminated; instead, when errors are detected, an error message is sent to the processor, i.e., the microcontroller, and an error counter is incremented if necessary. It is thus possible for the processor to communicate with the watchdog at any time but also with the environment of the control unit in which the processor is located.

It may be advantageous if the watchdog performs a software check by sending test queries to the processor, the watchdog then checking corresponding replies from the processor for correctness and whether these replies were received at the correct point in time. In this way, the relevant software base functions of the processor are checked for correct function.

Furthermore, it may be an advantage if the check of system components is initialized by tests assigned to the processor by the watchdog, the watchdog then checking corresponding assignment acknowledgments for correctness and the corresponding point in time at which the assignment acknowledgment was received.

It may be an advantage if when an error is detected, the watchdog directly blocks the device connected to the processor, preferably an output stage for triggering an airbag, for a specified period of time. If additional errors are detected within this blocking time, the block is prolonged accordingly. If an error results in a block, an error counter is incremented. If the error counter is equal to a predetermined value, the block is performed until the watchdog is deactivated. In a motor vehicle, this is the time span until the driving cycle is completed, i.e., the vehicle is turned off.

It may be a further advantage if when the device of the present invention is activated, a block is first present on the device connected to the processor and this block is only canceled if the system clock, the software of the processor and the system components are free of errors. This makes it possible for the device connected to the processor to be activated only with a correctly functioning processor.

It may be an advantage if the processor is able to read out the current error counter reading and the individual errors from the watchdog. This makes an exact analysis of the errors possible. It also may be possible to use it to generate a prediction, instructions for correction or even a warning.

Finally, it also may be an advantage if the point in time of receipt of the assignment acknowledgment or the reply of the processor is determined by an internal counter of the watchdog and that an error is detected if the point in time is exceeded or not met.

BRIEF DESCRIPTION OF THE DRAWINGS

Exemplary embodiments of the present invention are depicted in the drawings and explained in greater detail in the following description.

FIG. 1 shows a block diagram of an example device according to the present invention.

FIG. 3 shows a block diagram of the watchdog which shows the particular function blocks for the individual checks.

DETAILED DESCRIPTION

Figure 2:
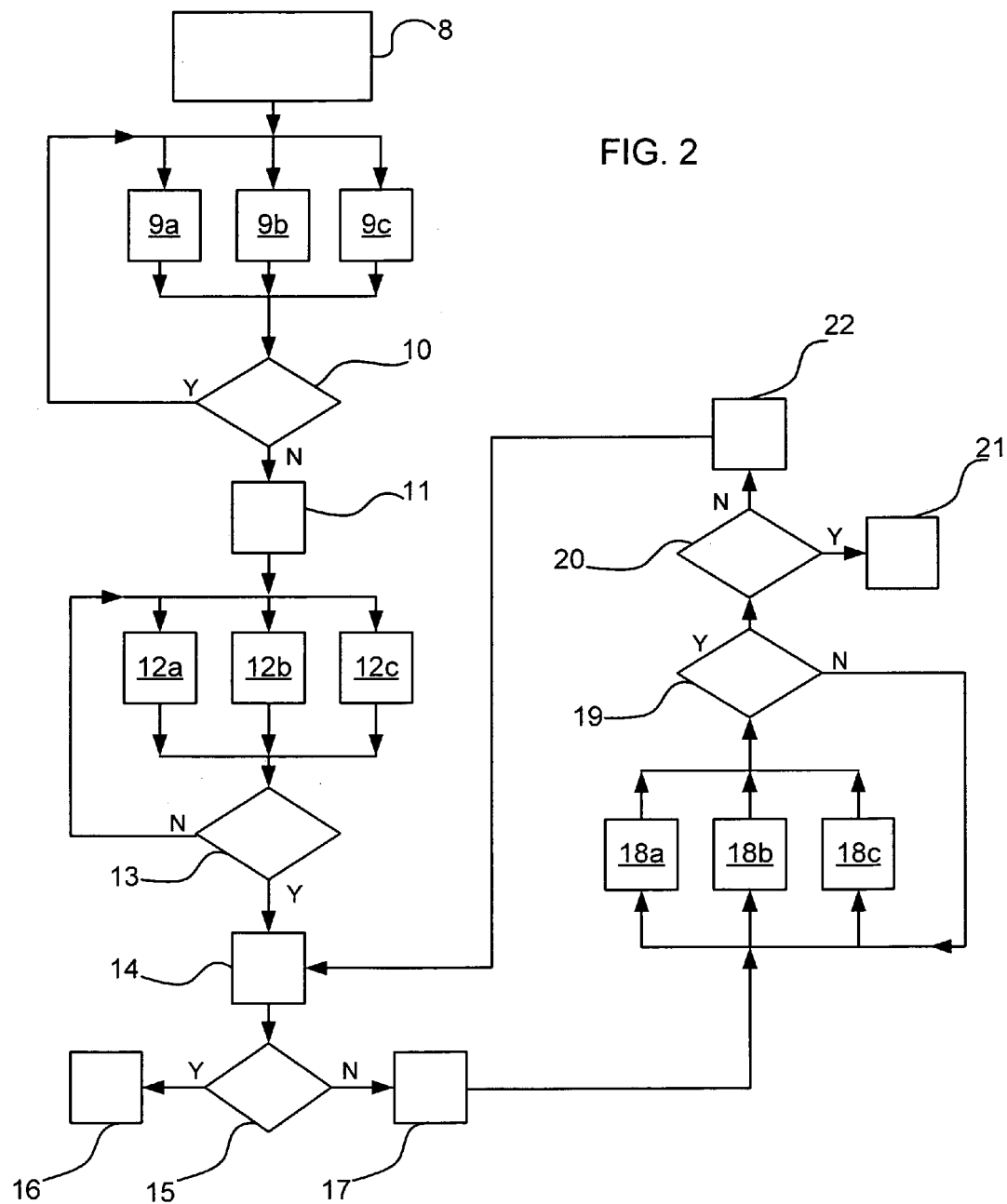
FIG. 2 shows a flow chart of an example method of the device according to the present invention.

Present-day watchdogs perform various tasks for monitoring a processor. Frequently, a microcontroller is used as a processor in safety-critical systems. However, other processor types may be used also. Safety-critical systems are, for example, restraint systems in a motor vehicle. In this case, it is necessary to check a controlling processor in order to prevent an erroneous triggering of an airbag, which may result in injuries. The processor is located together with the watchdog in a control unit for the restraint system.

According to an example embodiment of the present invention, therefore, a device is used which has separate hardware in a watchdog for each of the different tasks, so that the tasks are processed concurrently. Furthermore, the example device has the advantage that when an error is present, it is possible to communicate with the environment, with external diagnostic software, for example, thus no reset is performed. In this case, the watchdog performs the following tasks simultaneously and independently of each other: the monitoring of the processor's system clock, the software check in the processor and the monitoring of the tests of system components of the processor, for example, memory modules (RAM). A separate block of hardware is present for each of these three tasks, it being possible as an alternative for this to run on one processor, which assigns corresponding computing time to the particular tasks. The watchdog sends a query or task to the processor. The query is manipulated using small watchdog functions that run in the software base functions of the processor. The tasks trigger test routines in the background. These tests then check, for example, RAM, ROM and/or other system components.

If an error is detected, the watchdog initiates a block of a device connected to the processor. This prevents a malfunction of the processor resulting in the triggering of a device, a restraint system, for example.

A block diagram of the device of the present invention for monitoring a processor is shown in FIG. 1. A watchdog 4 has the components window watchdog 5, clock pulse generator 6 and counter 7. Window watchdog 5 has logic circuits. A processor 1 is connected to a memory 2 via a first data input/output, it also being possible for memory 2 to be integrated in processor 1. Processor 1 is connected to a restraint system 3 via a second data input/output. The connection may also be implemented using a bus. Processor 1 is connected to window watchdog 5 via a third data input/output. One data output of processor 1 leads to a first data input of window watchdog 5. If necessary, pulse dividers are present within window watchdog 5, which divide the clock pulse appropriately. Clock pulse generator 6 is connected to a second data input of window watchdog 5. Clock pulse generator 6 is independent of the clock pulse used by processor 1. Window watchdog 5 is connected to counter 7 via a second data input/output. Clock pulse generator 6 and counter 7 may each be a component of window watchdog 5. Instead of the one counter 7, one counter may be provided for the monitoring of the software base functions and one counter for the monitoring of the tests of the system components. Furthermore, window watchdog 5 is connected directly to restraint system 3 via a data output in order to block restraint system 3 when an error is detected.

In this case, processor 1 controls restraint system 3. For that purpose, processor 1 is, if necessary, connected to sensors in order to detect a triggering event for restraint system 3 and to classify, if necessary, persons to be protected in the vehicle. The function of processor 1 is checked by window watchdog 5. This function check is broken down into three tasks. First, the system clock of processor 1 is checked to determine if this system clock deviates from a predetermined value. For that purpose, processor 1 transfers its system clock to window watchdog 5.

Window watchdog 5 counts this clock pulse and compares it with a reference clock pulse, which is generated using clock pulse generator 6. If the deviation between the system clock of processor 1 and the clock pulse of clock pulse generator 6 exceeds a specific threshold value, an error is detected. This error is then communicated to processor 1; an error counter is incremented and via direct lines window watchdog 5 causes restraint system 3 to be blocked for a specific period of time. If an additional error is detected within this specified period of time, the block is then extended for a corresponding period of time.

Window watchdog 5 continues to check the operational capability of software functions of processor 1. These software base functions are necessary for the basic functionality of processor 1.

The actual task of a control unit for restraint systems 3 is to detect a crash. To that end, the following functions are processed every 500 µs, for example, as the software base functions:

Input of the sensor signals
Signal processing
Calculation of the algorithm to control the restraint system
In the event of a crash:
Determination of assigned firing devices
Triggering of these firing devices All of these functions must be processed, it being necessary in particular to maintain this sequence. For example, it is not possible to calculate the algorithm without having input sensor signals.

Window watchdog 5 performs this check via its first data input/output. For that purpose, window watchdog 5 sends test queries to processor 1, which processor 1 answers according to the software base functions present. Processor 1 then transfers these replies to window watchdog 5, which compares the replies with predetermined replies and also determines the particular point in time at which it received the particular replies. Window watchdog 5 determines these points in time using counter 7. If the reply or the point in time deviates from predetermined values, then window watchdog 5 detects an error and performs the corresponding error handling as described (blocking of restraint system 3). The query of watchdog 5 is changed in processor 1 with the aid of simple watchdog functions, primarily shift operations and masking operations. After all the watchdog functions that are distributed in the system-relevant software base functions have been processed, the value thus obtained is returned to the watchdog as a reply. During the check by window watchdog 5, it is made certain that the sequence of the watchdog functions and the processing of all watchdog functions has been followed. Counter 7 is designed in such a way that an error is detected if the reply arrives too early or too late.

Furthermore, window watchdog 5 performs a monitoring of the tests of the system components of the processor via its data input/output. To that end, watchdog 5 sends test assignments to processor 1, which processes them and returns corresponding assignment acknowledgments to window watchdog 5. Using the assignment acknowledgment, window watchdog 5 in turn monitors whether the tests of the system components were correct and received at the correct point in time. If the assignment acknowledgments are not correct or the assignment acknowledgment arrived too early or too late, an error is then detected. A test of a system component is initiated using the test assignment. The test itself then results in the assignment acknowledgment. In doing so, it is ensured that the assignment acknowledgments only correspond to the expected assignment acknowledgment if the test of the system component was processed without error.

The check of the software base functions using the watchdog functions is processed in processor 1 at a higher priority than the check of the system components. In doing so, only the remaining time is assigned to the check of the system components in a specified time period. For each of the three tasks of system clock check, software check and system components check, window watchdog 5, as shown in FIG. 3, has separate hardware components of logic circuits so that there is a genuine parallelism of the processing on the part of the window watchdog.

Block 23 is responsible for the check of the clock pulse, block 24 for the check of the software base functions and block 25 for the check of the system components. The system clock is connected to the first input of clock pulse check 23. Clock pulse check 23 then checks it for deviation from the predetermined internal reference clock pulse, clock pulse generator 6 being connected to the second input of function block 23. If there is an error, a signal is generated at the output of function block 23, the signal being linked to the outputs of function blocks 24 and 25 using an OR gate 26 so that when at least one error is detected, an error is displayed at output 27 of OR gate 26. In addition, function block 24 is connected to the data input/output of processor 1 via its data input/output in such a way that a check of the software base functions is possible. On the other hand, function block 25 is connected to processor 1 via its data input/output in such a way that a test of the system components is possible.

Since processor 1 is able to communicate with window watchdog 5 at all times, even during a block, it is also possible that processor 1 is able to read out the error counter reading and the individual errors for further processing.

A flow chart is shown in FIG. 2 which depicts the operating sequence of the example device.

In step 8, the example device of the present invention is activated and a block of restraint system 1 by window watchdog 5 is initiated first. In steps 9a, 9b and 9c, the system clock, the software base functions and the system components are then monitored concurrently and independently of each other.

In step 10, it is checked whether or not at least one error is displayed at OR gate 26. If this is the case, then a return is made to steps 9a, 9b and 9c to check whether or not the system clock, the software and the system components are in order for a minimum period of time. All parts 23, 24 and 25 of window watchdog 5 must be correctly operated for one second, for example, to unblock the restraint system. Only then is freedom from errors detected and it is then possible to move from step 10 to step 11 to cancel the block of restraint system 3.

In steps 12a, 12b and 12c, tests of the system clock, the software base functions and the system components of processor 1 are repeated. In step 13, it is checked again whether or not an error is displayed at the output of OR gate 26. If this is not the case, then a return is made to steps 12a, 12b and 12c in order to repeat the tests. If, however, an error was detected, this error is then communicated to processor 1 by window watchdog 5 in step 14, an error counter is incremented and restraint system 3 is blocked. In step 15, it is also checked if the error has in the meantime reached a predetermined value, which would result in a continuous block of restraint system 3 until the device of the present invention is deactivated. Therefore, the block is maintained in step 16 until deactivation.

In step 17, however, if the error counter was still not reached, the block is discontinued for a specified period of time. In steps 18a, 18b and 18c, the system clock, the software base functions and the system components are rechecked in order then to determine in step 20 if an error was detected within the block of restraint system 3, so that if this is the case, the block must be extended accordingly in step 21. If this is not the case, then the block is canceled in step 22 after the end of the time period in order then to return to step 14.

What is claimed is:

1. A device for monitoring a processor, comprising:
a watchdog configured to monitor the processor, the watchdog configured to connect to an internal clock pulse generator for monitoring a system clock of the processor, the watchdog including an arrangement for checking software of the processor and an arrangement for monitoring tests of system components of the processor, the watchdog configured to transmit an error message to the processor in an event that at least one error is detected and increment an error counter, and wherein the watchdog transmits test queries to the processor during a checking of the software and monitors replies from the processor for correctness and point in time.

2. The device as recited in claim 1, wherein the watchdog is configured to transfer test assignments to the processor when tests of the system components are monitored and the processor returns the test assignments to the watchdog corresponding to an assignment acknowledgment, which the watchdog monitors for correctness and point in time.

3. The device as recited in one of claim 2, wherein the watchdog is configured to determine the points in time of the replies of the processor and the acknowledgment of the assignments using at least one internal counter.

4. The device as recited in claim 1, wherein the watchdog is configured to block a function of a device connected to the processor for a specified period of time in a case of at least one detected error, the watchdog being directly connectable to the device.

5. The device as recited in claim 4, wherein the watchdog is configured to initiate the block of the device until the watchdog is deactivated when the error counter has reached a predetermined value.

6. The device as recited in claim 4, wherein the device connected to the processor is a restraint system.

7. The device as recited in claim 4, wherein when activated, the watchdog initiates the block of the device until the watchdog detects freedom from errors in the system clock, the software of the processor and the system components.

8. The device as recited in claim 1, wherein the processor is configured to read out the error counter and individual errors from the watchdog.

9. A device for monitoring a processor, comprising:
a watchdog configured to monitor the processor, the watchdog configured to connect to an internal clock pulse generator for monitoring a system clock of the processor, the watchdog including an arrangement for checking software of the processor and an arrangement for monitoring tests of system components of the processor, the watchdog configured to transmit an error message to the processor in an event that at least one error is detected and increment an error counter, wherein the watchdog is configured to block a function of a device connected to the processor for a specified period of time in a case of at least one detected error, the watchdog being directly connectable to the device, and wherein the watchdog is configured to extend the block of the device if the watchdog detects at least one additional error during the block.

* * * * *